United States Patent Office 3,156,109
Patented Nov. 10, 1964

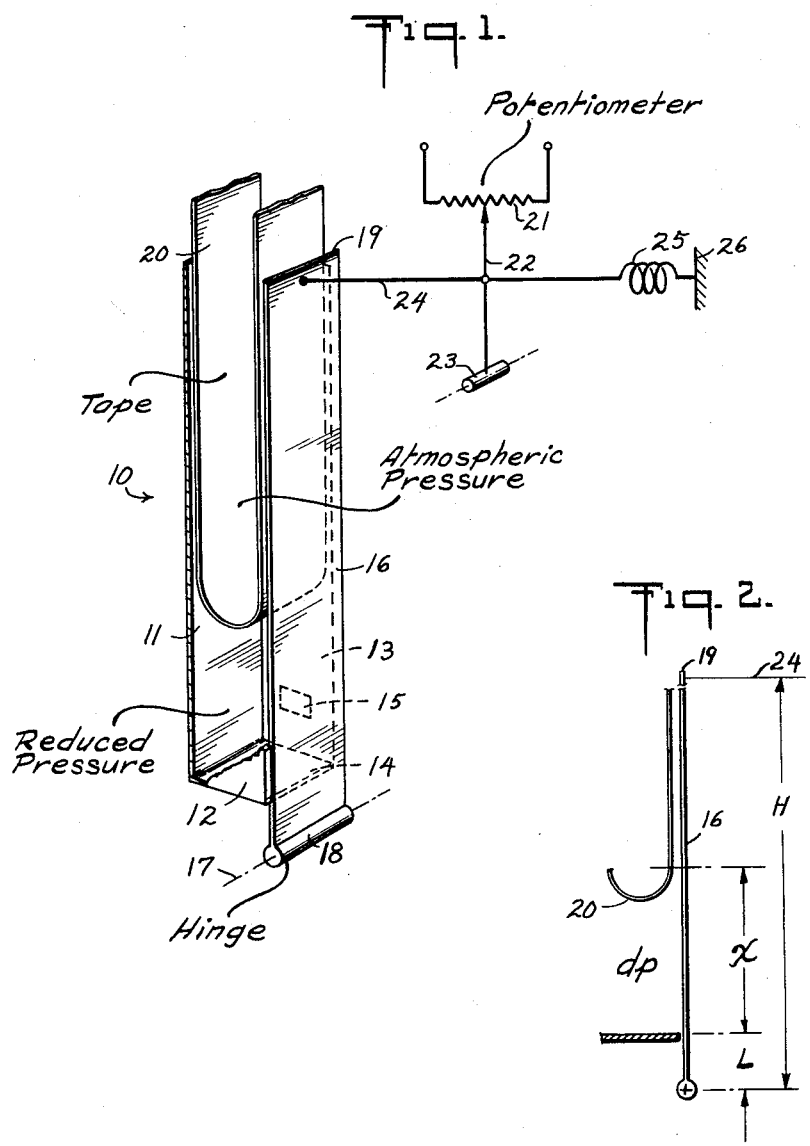

3,156,109
TAPE LOOP GAGE
Ivan O. Fieldgate, Halesite, N.Y., assignor to Potter Instrument Company, Inc., Plainview, N.Y., a corporation of New York
Filed Sept. 7, 1962, Ser. No. 222,072
2 Claims. (Cl. 73—37)

This invention, generally, relates to tape handler apparatus and, more particularly, to a tape loop gage for such apparatus.

When it is desired to move tape at rapid rates for processing information, it is usually desirable to maintain intermediate tape storage facilities, such as in the form of one or more loops of tape, to provide increased flexibility of operation. The vacuum tank is uniquely fitted to provide the desired tape loop storage because of its low inertia characteristics, but it is desirable to develop and maintain a suitable measure of the quantity of tape stored in the vacuum tank.

Accordingly, it is an object of this invention to provide a new and improved measuring means for a tape loop in a vacuum tank.

Another object of the present invention is to provide a tape loop gage adapted to a vacuum receptacle.

Briefly, the invention contemplates the provision of a vacuum tank having a tape loop-receiving opening and at least a portion of one side of the tank being moveable. A linkage is connected between the moveable side portion and a reference point. A suitable gage or other indicating means is connected with the linkage at a convenient point to be responsive to movement in the linkage to obtain a predetermined external influence, such as to present a representation of the quantity of tape in the loop.

The above and other objects and advantages of the invention will become more apparent from the following detailed description of a preferred form thereof taken in conjunction with the accompanying drawings, in which:

FIG. 1 is a diagrammatic view in perspective illustrating an arrangement in accordance with the principles of the invention; and FIG. 2 is a diagrammatic illustration for the purposes of describing the principles of the invention.

Referring now to FIG. 1 of the drawings, a tape storage means is provided by a vacuum tank indicated generally by the numeral 10. The tank 10 is formed of a substantially rigid material having three sides 11, 12 and 13 and a bottom 14. One of the sides 13 is provided with a suitable connection means or port 15 for attaching a vacuum source, not shown.

A fourth side of the vacuum tank 10 is provided by a moveable section 16 which, in the form of the invention illustrated, is pivotable about an axis 17 including a hinge 18. The end 19 of the moveable side 16 furthermost from the hinge 18 is moveable toward and away from the side 11 depending upon the depth of a tape loop 20 in the vacuum tank 10, as will be explained in greater detail presently.

A potentiometer 21 having a sliding contact 22 which is moveable about a predetermined axis 23 is illustrative of device that is reponsive to movement in the side 16. A linkage 24 is connected between the moveable side 16 and the moveable arm 22 of the potentiometer 21, so that, as the end 19 of the side 16 is deflected, there is a change in the setting of the potentiometer 21.

A coil spring 25 is attached between a reference point 26 and the linkage 24 and may be used to determine a neutral setting for the moveable arm 22.

Referring now to FIG. 2 of the drawings for a more detailed explanation of the principles of the invention, it will be observed that by hinging one side, or a portion of one side, of the vacuum tank and then utilizing the differential pressure across the sides of the moveable side 16 as altered by the position of a loop 20 of tape in the vacuum tank 10, the magnitude of the force which can be developed on a linkage 24, FIG. 1, is varied linearly. The differential pressure on the side 16 above the loop 20, as viewed in FIG. 2, is zero since atmospheric pressure exists above the loop.

If the pressure differential between the volume under the loop and the ambient is $\Delta p$, then the force exerted on the side wall is $\Delta p \times \chi \times \mu$, when $\chi$ is the distance from the tangent of the loop to the wall and the base of vacuum chamber and $\mu$ is the depth of the chamber. This force exerted a turning moment about the hinge point 17 of $$(\Delta p \cdot \chi \cdot \mu)\left(\frac{\chi}{2}+L\right)$$

when L is the distance shown in FIG. 2.

If the distance from the point of attachment of the arm 24 to the hinge point 17 is H, then the force on the spring 25 is equal to $$(\Delta p \cdot \chi \cdot \mu)\left(\frac{\chi}{2}+L\right)/H$$

The magnitude of the available forces is sufficiently large to provide useful work for such purposes as driving a potentiometer arm. Also, the moveable side 16 moves only enough that the motion of the free end can be considered as substantially parallel for practical purposes. This assists in using the free end 19 for gaging the position of the moveable side 16.

As the tape 20 is formed into a larger and larger loop extending further and further into the vacuum tank 10, it may be seen that the area or volume of the atmospheric pressure increases within the tank and the volume of reduced pressure decreases as the lower end of the loop approaches the vacuum source connection 15.

Clearance between the edges of the moveable section 16 and the sides 12 and 13 may be as small or smaller than that between the edges of the tape loop 20 and these same sides. The side 12 is shown cut away to give a better view of the tape loop 20, but since vacuum tanks for developing loops in tape of this nature are so well known that the illustration of the side 12 in this cut away manner will be understood readily.

Other modifications will occur to one skilled in the art to which the invention pertains, and it is understood that the scope of the present invention is defined by the claims appended hereto.

What is claimed is:

1. In an information processing apparatus having a vacuum chamber with an opening for receiving a tape loop, said vacuum chamber comprising,
  means to define an enclosure having at least three sides and a bottom and a tape loop-receiving opening,
  a fourth side of said enclosure parallel to a flat side of the tape and including hinge means permitting the fourth side to pivot in an arcuate manner and in close-fitting relationship with two of the sides, said enclosure including means to connect a vacuum source to the enclosure for developing a tape loop, and means on said pivotable fourth side for attaching a mechanical linkage at a predetermined distance from the hinge means to develop a physical movement in a mechanically actuatable device.

2. An information processing apparatus in accordance with claim 1 wherein said hinge means extends along a line parallel to the long dimension of the vacuum chamber.

References Cited by the Examiner

UNITED STATES PATENTS

| | | | |
|---|---|---|---|
| 2,857,495 | 10/58 | Bourns et al. | 73—398 X |
| 2,952,415 | 9/60 | Gilson | 242—55.12 |
| 3,027,059 | 3/62 | Streeter | 226—45 |
| 3,038,339 | 6/62 | Colvin | 73—407 |

RICHARD C. QUEISSER, *Primary Examiner.*
JOSEPH P. STRIZAK, *Examiner.*